(12) United States Patent
Meng et al.

(10) Patent No.: US 10,845,979 B2
(45) Date of Patent: Nov. 24, 2020

(54) METHOD AND SYSTEM FOR DIGITAL CONTENT DISPLAY AND INTERACTION

(71) Applicant: TCL RESEARCH AMERICA INC., San Jose, CA (US)

(72) Inventors: Di Meng, San Jose, CA (US); Haohong Wang, San Jose, CA (US); Allan He, San Jose, CA (US)

(73) Assignee: TCL RESEARCH AMERICA, INC., San Jose, CA (US)

( * ) Notice: Subject to any disclaimer, the term of this patent is extended or adjusted under 35 U.S.C. 154(b) by 0 days.

(21) Appl. No.: 16/244,591

(22) Filed: Jan. 10, 2019

(65) Prior Publication Data
US 2020/0225822 A1 Jul. 16, 2020

(51) Int. Cl.
G06F 3/048 (2013.01)
G06F 3/0485 (2013.01)
G06F 3/0489 (2013.01)
G06F 3/038 (2013.01)
G06F 3/0484 (2013.01)

(52) U.S. Cl.
CPC ............ *G06F 3/0485* (2013.01); *G06F 3/038* (2013.01); *G06F 3/04847* (2013.01); *G06F 3/04892* (2013.01)

(58) Field of Classification Search
None
See application file for complete search history.

(56) References Cited

U.S. PATENT DOCUMENTS

| | | | | |
|---|---|---|---|---|
| 2006/0150215 | A1* | 7/2006 | Wroblewski | G06F 3/0481 725/47 |
| 2007/0192794 | A1* | 8/2007 | Curtis | G06F 3/04817 725/42 |
| 2012/0092299 | A1* | 4/2012 | Harada | G06F 3/04883 345/174 |
| 2014/0108978 | A1* | 4/2014 | Yu | G06F 3/04817 715/765 |
| 2017/0046872 | A1* | 2/2017 | Geselowitz | G06T 15/205 |

OTHER PUBLICATIONS

Potvin, Pascal, "Rethinking User Interface Design for the TV Platform", https://www.toptal.com/designers/ui/tv-ui-design, (2018), pp. 1-18.
Vanhemert, Kyle "To Grow, Netflix Must Learn From The Quietly Brilliant UI of Regular TVS", https://www.wired.com/2014/02/regular-old-tv-still-has-the-best-ui-around-nethix-should-copy-it, (Feb. 2014), pp. 1-6.

(Continued)

*Primary Examiner* — Thanh T Vu
(74) *Attorney, Agent, or Firm* — Anova Law Group, PLLC

(57) ABSTRACT

A method for displaying digital content in an interactive navigation interface is provided. The method includes: displaying a plurality of top-level category groups on a display screen; receiving a user pointing operation selecting one of the top-level category groups from a remote controller; providing visual feedback for the selected top-level category group; and in response to a zoom-in operation on the selected top-level category group received from the remote controller, displaying a plurality of digital content objects within the selected top-level category group.

14 Claims, 14 Drawing Sheets

(56) References Cited

OTHER PUBLICATIONS

Abreu, J., Ferraz et al., "Interactive television UI: Industry trends and disruptive design approaches", 6th Iberoamerican Conference on Applications and Usability of Interactive TV—Conference Paper—Aug. 2017, At Aveiro, Portugal. pp. 1-13.

Bederson, B. Benjamin, "The Promise of Zoomable User Interfaces". Behaviour & Information Technology, vol. 30, No. 6, 2011, Human-Computer Interaction Lab, Computer Science Department, University of Maryland, pp. 853-866.

Fleischman Michael et al., "Recommendations Without User Preferences: A Natural Language Processing Approach", USC Information Science Institute, (2003) IUI 2003 Proceedings of the 8th international conference on Intelligent user interfaces, Jan. 2003, p. 242-244.

Grimaldi, E., "How to Build a Content-Based Movie Recommender System with Natural Language Processing". Oct. 1, 2018, https://towardsdatascience.com/how-to-build-from-scratch-a-content-based-movie-recommender-with-natural-language-processing-25ad400eb243, pp. 1-9.

Wang, Haohong et al., "A New TV World for Kids—When ZUI Meets Deep Learning", TCL Research America, University of Missouri, and Amazon.com, Inc. (2018), IEEE MIPR 2018, Miami, pp. 1-6.

Lekakos, George et al., "Information Systems in The Living Room: A Case Study of Personalized Interactive TV Design", Global Co-Operation in the New Millennium. The 9th European Conference on Information Systems Bled, Slovenia, Jun. 27-29, 2001, pp. 319-329.

\* cited by examiner

METHOD AND SYSTEM FOR DIGITAL CONTENT DISPLAY AND INTERACTION

TECHNICAL FIELD

The present disclosure relates to the field of content display technologies, and in particular, to a method and system for the organization, display, and interaction of digital contents.

BACKGROUND

The majority of television user interfaces (TV UIs) are navigated by a user using a remote control device at a distance from the screen. The user may navigate to the element they want to select on the TV screen using a directional control pad (D-pad) which provides a limited number of directions such as left, right, up, and down. This interaction format limits the TV user interface to rows and columns type grid layout for its content organization and categorization. The grid-based UIs provide limited view among groups of digital content objects. The user control and operations are also limited to scrolling up and down, or left and right with a predefined order to find a content object of interest with little context to help the memorization and orientation. This interaction method may require heavy workload to browse, interpret, and memorize the contents on the screen. The repeated left/right/up/down clicks needed for the user to select a desired content object may be time consuming and tedious, rendering a non-ideal user experience.

SUMMARY

The present disclosure provides a method and system for organizing, displaying, and interacting contents on a screen to enhance flexibility, efficiency, and user experience.

One aspect of the present disclosure provides a method for displaying digital content in an interactive navigation interface. The method includes: displaying a plurality of top-level category groups on a display screen; receiving a user pointing operation selecting one of the top-level category groups from a remote controller; providing visual feedback for the selected top-level category group; and in response to a zoom-in operation on the selected top-level category group received from the remote controller, displaying a plurality of digital content objects within the selected top-level category group.

In certain embodiments, the plurality of digital content objects within the selected top-level category group are a plurality of second-level category groups; and the method further includes: receiving a user pointing operation selecting one of the second-level category groups from a remote controller; and in response to a zoom-in operation on the selected second-level category group received from the remote controller, displaying a plurality of next-level digital content objects within the selected second-level category group.

In certain embodiments, the method further includes: displaying information related to the selected top-level group in a pop-up window.

In certain embodiments, the plurality of digital content objects are displayed in a radial distribution according to a category relevance order.

In certain embodiments, the method further includes: in response to a pan operation received from the remote controller, scrolling the display of the plurality of digital content objects.

In certain embodiments, the plurality of top-level category groups are based on one of: a set of keyword tags; a customized set of keyword tags provided by the user; or a processing result of an artificial intelligent algorism performed on data collected on the user.

In certain embodiments, the plurality of digital content objects are displayed in an irregular-shaped distribution.

Another aspect of the present disclosure provides a method for interacting with a navigation interface on a display screen using a remote controller. The method includes: receiving a user pointing operation on the remote controller; converting the user pointing operation into a user pointing command, the user pointing command including a selection position; sending the user pointing command to the display screen to cause the display screen to: select a top-level category group among a plurality of top-level category groups displayed on the display screen according to the selection position; and provide visual feedback for the selected top-level category group. The method further includes: receiving a zoom-in operation on the remote controller and converting the zoom-in operation into a zoom-in command; and sending the zoom-in command to the display screen to cause the display screen to display a plurality of digital content objects within the selected top-level category group.

In certain embodiments, the plurality of digital content objects within the selected top-level category group are a plurality of second-level category groups; and the method further comprises: receiving a second user pointing operation on the remote controller; converting the second user pointing operation into a second user pointing command, the second user pointing command including a second selection position; sending the second user pointing command to the display screen to cause the display screen to: select a second-level category group among the plurality of second-level category groups displayed on the display screen according to the second selection position; and provide visual feedback for the selected second-level category group; receiving a second zoom-in operation on the remote controller and converting the second zoom-in operation into a second zoom-in command; and sending the second zoom-in command to the display screen to cause the display screen to display a plurality of next-level digital content objects within the selected second-level category group.

In certain embodiments, the method further includes: receiving a hover operation on the remote controller; converting the hover operation into a hover command; and sending the hover command to the display screen to cause the display screen to display information related to the selected top-level group in a pop-up window.

In certain embodiments, the method further includes: receiving a pan operation on the remote controller; converting the pan operation into a pan command; and sending the pan command to the display screen to cause the display screen to scroll the display of the plurality of digital content objects.

Another aspect of the present disclosure provides a system for displaying digital contents in an interactive navigation interface. The system includes: a display screen; a display control unit electronically coupled to the display screen; and a remote controller wirelessly coupled to the display control unit. The display control unit is configured to: control the display screen to display a plurality of top-level category groups; receive a user pointing operation selecting one of the top-level category groups from the remote controller; control the display screen to provide visual feedback for the selected top-level category group;

and in response to a zoom-in operation on the selected top-level category group received from the remote controller, control the display screen to display a plurality of digital content objects within the selected top-level category group.

In certain embodiments, the plurality of digital content objects within the selected top-level category group are a plurality of second-level category groups; and the display control unit is further configured to: receive a user pointing operation selecting one of the second-level category groups from a remote controller; and in response to a zoom-in operation on the selected second-level category group received from the remote controller, control the display screen to display a plurality of next-level digital content objects within the selected second-level category group.

In certain embodiments, the display control unit is further configured to control the display screen to display information related to the selected top-level group in a pop-up window.

In certain embodiments, the display control unit is configured to control the display screen to display the plurality of digital content objects in a radial distribution according to a category relevance order.

In certain embodiments, the display control unit is further configured to: in response to a pan operation received from the remote controller, control the display screen to scroll the display of the plurality of digital content objects.

In certain embodiments, the display control unit defines the plurality of top-level category groups according to one of: a default set of keyword tags; a customized set of keyword tags provided by the user; or a processing result of an artificial intelligent algorism performed on data collected on the user.

In certain embodiments, the display control unit is configured to control the display screen to display the plurality of digital content objects in an irregular-shaped distribution.

The above aspects will be described in detail with the accompanying drawings.

BRIEF DESCRIPTION OF THE DRAWINGS

In order to more clearly illustrate the technical solutions in the embodiments of the present disclosure, the drawings used in the description of the embodiments will be briefly described below.

DETAILED DESCRIPTION OF THE EMBODIMENTS

Figure 1:
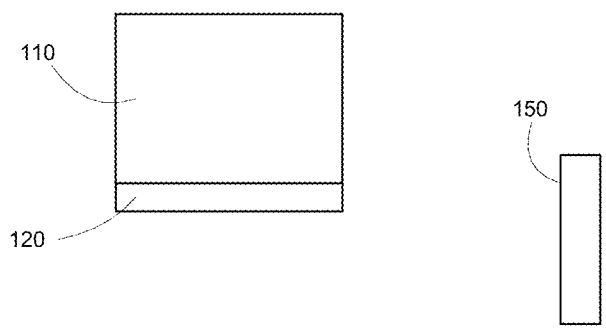
FIG. 1 is a diagram of a digital content display and interaction system according to an embodiment consistent with the present disclosure.

Technical solutions of the present disclosure will be described with reference to the accompanying drawings. It should be understood that the described embodiments are some but not all of the embodiments of the present disclosure. Other embodiments derived by those with ordinary skills in the art on the basis of the described embodiments without inventive efforts should fall within the scope of the present disclosure.

Often, a user interacts with contents displayed on a TV screen using a remote control or a game console to navigate with a D-pad to move up/down/left/right to select an item of interests. The contents on the screen are typically organized and categorized in a "rows and columns" type grid layout for the user to navigate. The grid-based UIs provide limited view among groups of digital content objects. The user control and operations are also limited to scrolling up and down, or left and right with a predefined order to find a content object of interest with little context to help the memorization and orientation. This interaction method may require heavy workload to browse, interpret, and memorize the contents on the screen. The repeated left/right/up/down clicks needed for the user to select a desired content object may be time consuming and tedious, rendering a non-ideal user experience.

An airmouse type pointing device may point directly at a TV set screen. It provides direct interactions between the user hand that holds the pointing device and the TV screen. Android TV based on Kodi has support for airmouse usage. This could provide capability to the interactive TV user interface to break the limit of current program guide design with 4-direction navigation to browse the content. In recent years, gaming control devices including VR content controller such as Vii, Oculus, etc. have been developed to promote TV display operation with pointing, panning, and zooming operations. It potentially breaks the traditional paradigms to build the iTV user interface with limited grid layout.

Embodiments of the present disclosure are enabled by a specifically designed remote controller. The user may point to any object on a TV display just like a mouse pointing function without continuous left, right, up, and down operations to navigate. The in-focus digital content object may send visual feedback and more information to allow performing further tasks, if applicable. The user may also further zoom into deeper levels to explore more related content within a group categorized with tags that match the user's preferences.

One embodiment of the present disclosure is to set forth a design for interactive TV (iTV) content objects displaying and browsing. One embodiment of the present disclosure may provide a TV graphical user interface design principle to enhance the users' capability of browsing and navigating media content items with a map-like user experience. The content organization method consistent with embodiments of the present disclosure provides layered navigation that allows the user to access the preferred information with fewer operations in contrast to the grid based media-services content display and organization with limited interaction capabilities.

The fluid UI (user interface) structure and content organization layout consistent with embodiments of the present disclosure allows customizations by the user or the system due to its map layout nature. Such a structure doesn't break user's view of the surrounding content, neither any business logic an application may apply.

Embodiments consistent with the present disclosure provide neighbor groups content like map at any zoom level, which solves the breadcrumb type navigation usability issue with back and forth drilldown and come back among groups, subgroups, and their content. Moreover, the tag-based content categorization consistent with embodiments of the present disclosure considers more about user preferences as compared with traditional genres and other classical categorizations. Embodiments consistent with the present disclosure thus help the user find favorite and most-related content fast and accurately.

In the system and method provided by the present disclosure, the user may use a remote controller to point to any object displayed on the screen without continuous left, right, up, and down operations to navigate. FIG. 1 is a diagram showing a digital content display and interaction system according to certain embodiments of the present disclosure. As shown in FIG. 1, the system includes a display screen 110, a display control unit 120, and a remote controller 150. The display control unit 120 is electronically coupled to the display screen 110 to output digital contents. The display control unit 120 may also generate, maintain, and process a navigation interface displayed on the display screen 110. The navigation interface may be configured to allow a user to find and select a digital content object of interests. The remote controller 150 may be electronically coupled to the display control unit 120 and/or the display screen 110 to interact with the navigation interface and the digital contents outputted on the display screen 110. For example, in certain embodiments, the remote controller 150 may be a handheld controller that includes positional, movement, and/or acceleration sensors. The remote controller 150 may wirelessly communicate with the display control unit 120 and/or the display screen 110, and the position, movement, and/or acceleration signals of the remote controller 150 may be used to control a cursor on the display screen 110. A user may use the remote controller 150 to move the cursor to point to a digital content object displayed on the display screen 110. The UI application may enable the digital content object being pointed to provide visual feedback and additional information to allow further interaction from the user.

In the present disclosure, a unit or a module refers to computer program logic utilized to provide the specified functionality. Thus, a unit or a module may be implemented in hardware, firmware, and/or software. In some embodiments, program modules are stored on the storage device, loaded into the memory, and executed by the processor. When executed by one or more processors, a functional module implements the functions described in the embodiments of the present disclosure. In some embodiments of the present disclosure, a unit such as the display unit may refer to software and hardware components and combinations thereof. When executed by one or more processors, the software component may implement the described functions together with hardware components.

The digital content display and interaction system may allow the user to point to any object on the screen as well as to take a further action as preferred. Thus, the user would not need to go through many up/down/left/right clicks to select a digital content object of interest, improving the navigation efficiency and convenience for the user.

Figure 2:
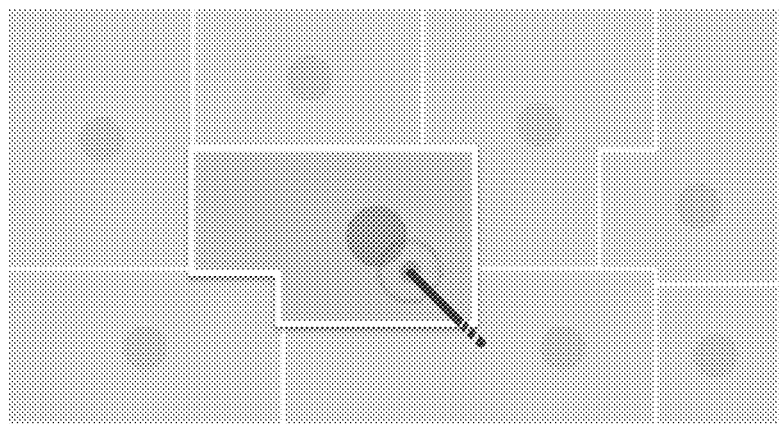
FIG. 2 is a set of top-level category groups displayed on the display screen according to an embodiment consistent with the present disclosure.

FIG. 2 illustrates an example of digital contents displayed on the display screen. As shown in FIG. 2, digital content objects may be grouped into a plurality of categories and a user may use the remote controller to point to and focus on a specific category. Also as shown in FIG. 2, the category that has been pointed to may provide visual feedback, for example, being highlighted or undergoing a color change. The digital content objects may include images related to movie, games, audios, photos, or other media-services content according to the application or service types. The digital content objects may also include titles or categories of the digital contention, such as a movie title, or a movie genre. In certain embodiments, the digital content objects may be marked with keyword tags, such as characters, rating, publishing year, genres, audience age, etc., and then categorized into a number of top-level category groups and other category groups. The top-level category groups may be displayed in a grid or on a map. In some embodiments, the second-level category groups may also be displayed in a grid or on a map. The group organization and categorization may be defined according to the application and the convenience of the audience, so a user may quickly locate topics of interests and explore related content.

Figure 3:
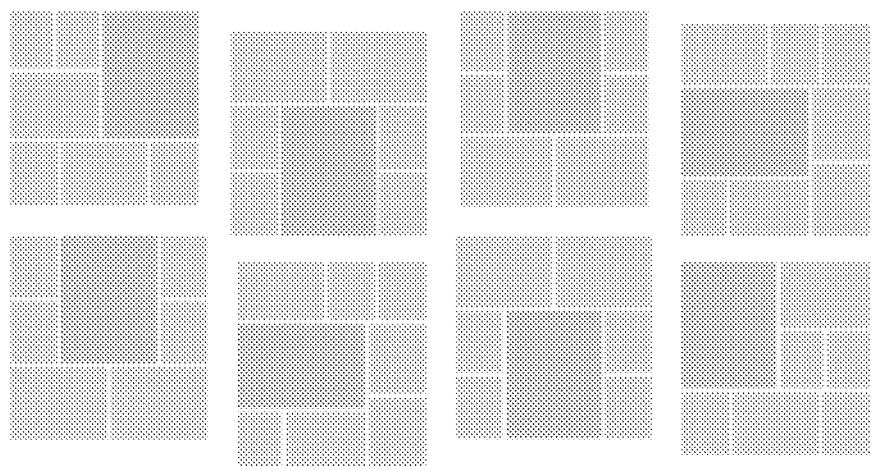
FIG. 3 illustrates examples of second-level category groups according to certain embodiments consistent with the present disclosure.
Figure 4:
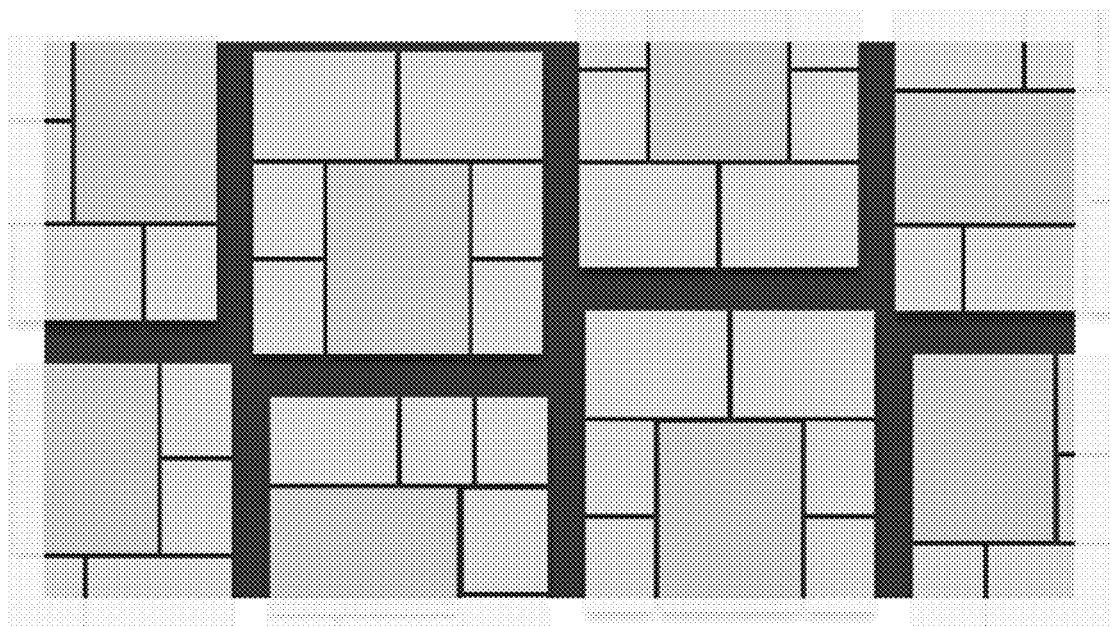
FIG. 4 is a set of second-level category groups displayed on the display screen according to certain embodiments consistent with the present disclosure.

In certain embodiments, in response to the user pointing to and focusing on a specific category group displayed on the display screen, the interactive interface may allow the user to further zoom into deeper levels of subcategories to explore related contents. FIG. 2 and FIG. 3 show examples of views of second-level groups and categories. As shown in FIG. 2, each top-level category group may include a plurality of second-level category groups. As shown in FIGS. 3 and 4, the second-level category groups may also be displayed in a grid or map format along with the top-level category groups. The user may point to and focus on a second-level category group.

In embodiments of the present disclosure, when the user zoomes into a deeper level, more digital content objects may be displayed in each group with the highest relevancy and representativeness to the defined category. The UI may bring the user's point of interest to the center view of the screen as part of the interaction focus and as one of the top-level category groups. The UI may enable further zoom-in from the top level, displaying the most representative objects of each category group. The number of the digital content objects may be based on the application data structure and user needs with preferred layout. As shown in FIG. 4, the user can choose a digital content object to view certain details, or choose to play the content, or any actions that are applicable based on the application needs. The user can also choose to zoom in again to see more digital content objects of the group.

Figure 5:
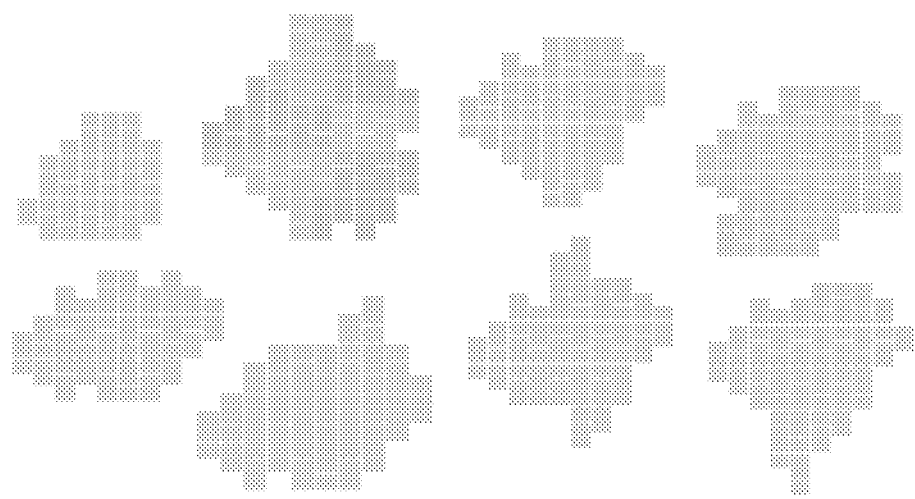
FIG. 5 illustrates examples of displayed digital content objects according to certain embodiments consistent with the present disclosure.
Figure 6:
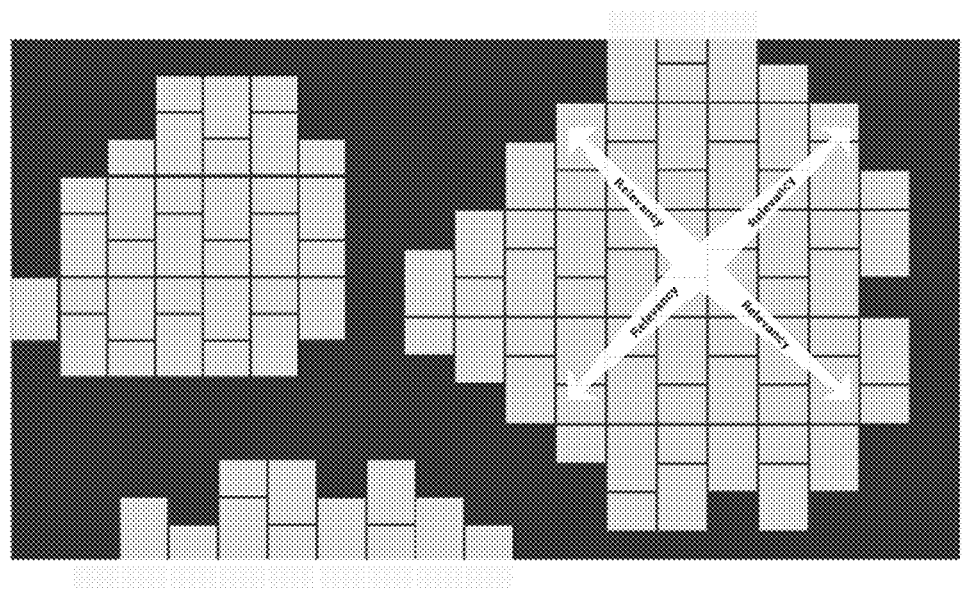
FIG. 6 illustrates digital content objects displayed in a radial distribution according to certain embodiments consistent with the present disclosure.

In certain embodiments, the user may further zoom in from a second-level category group to see a number of third-level content objects. FIG. 5 and FIG. 6 illustrate examples of third-level content objects. To further zoom in, the user can see more number of content of the interested groups with radius distribution. In one embodiment, the UI may order category groups by category relevancy from the group center to the edge of the group. Letting the user further zoom in or not may be defined by the application's needs. Continue with the application example, when zooming into a deeper level, the user may see more digital content objects per category group. This fluid layout may display category groups with different total numbers of content to form irregular shapes of content map that can contain different numbers of subgroups, as shown in FIGS. 5 and 6. In some embodiments, for easy user navigation purposes, the UI may be conservative on zoom depth to avoid disorientating the user. UI components to facility the user's orientation can be added to facilitate user navigation.

Specifically, as shown in FIG. 6, in certain embodiments, the digital content objects may be displayed in a radial distribution according to a sorting order of category relevancy from the center to the edge of the display. The digital contents that are most relevant according to a selection criterion may be displayed at the center of the display, while less relevant contents are displayed toward the edge of display. In certain embodiments, the third-level content objects may be third-level category groups and further levels are available for zooming in to allow the display of additional contents. In certain other embodiments, a maximum zoom-in level may be configured to limit the depth of the zoom-in operation to avoid disorientating the user. In certain embodiments, at each level, the user may choose a content to view certain details, or choose to play the content, or to perform other actions that are applicable based on the application needs. The user may also choose to zoom in again to see more contents of the group.

In certain embodiments, such as shown in FIG. 5 and FIG. 6, category groups may include different total number of digital content objects and form content maps with irregular shapes. The number of the digital content objects for a specific category group may vary depending on the application data structure and/or user preference for layout.

In some embodiments, the user may pan the display in order to see other digital content objects. When the user is at a zooming level when the whole view cannot fit into the screen, the UI may allow the user to move the content in any direction to find the interested groups as well as their content. That is, at any zoom level, the user would not lose the neighbor groups' digital content object information during navigation, which has been the disadvantage of the breadcrumb navigation. The breadcrumb navigation method requires user to click and drill down to see what is out there in one group and then click back and drill down again to see the content in another group. The map-like panning and zooming in embodiments of the present disclosure thus improve the TV UI designs.

Embodiments of the present disclosure provides a specially made remote control device allowing the user to point to any object on the screen view as well as to take a further action as preferred. Unlike most other user interfaces, in which the user needs to go through many clicks to get to a location that contains interested content, embodiments of the present disclosure enable free form pointing interactions, reducing many clicks and efforts by the user and considerably improve the user interaction efficiency.

Along with the pointing capability, embodiments of the present disclosure also provide remote control device with a hover over function as a regular mouse can do on a personal computer. An application can thus utilize this function to provide critical information to the user regarding the in-focus digital content object.

Figure 7:
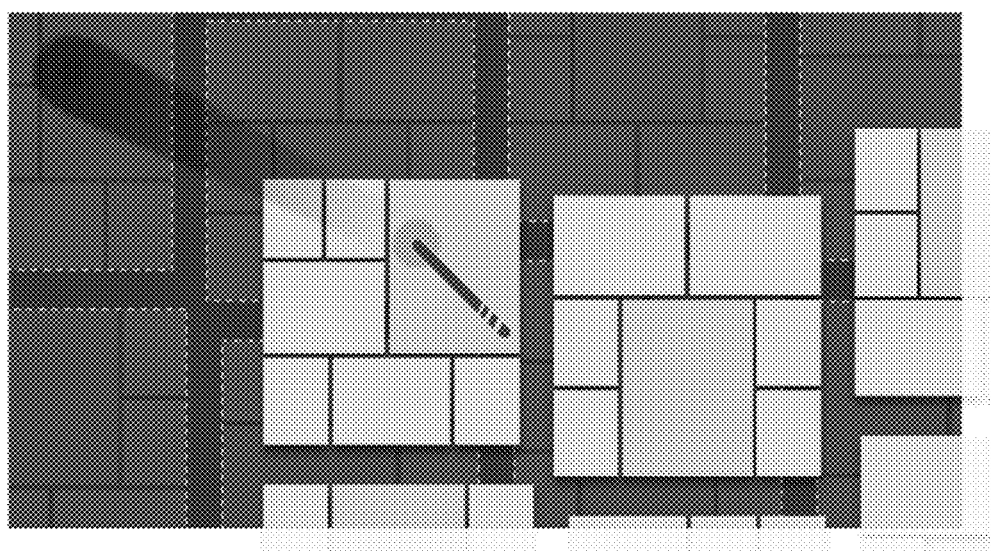
FIG. 7 shows display of digital content objects in response to a pan operation according to an embodiment consistent with the present disclosure.

In some embodiments, in order to display a large number of digital content objects on a limited display screen, the system may allow the user to pan the display map to navigate additional digital content objects in a group category when the user is at a zooming level where the whole view cannot fit into the screen. FIG. 7 illustrates an interactive interface with a user panning the content map at a certain zooming level. The panning operation allows the user to retain neighboring content objects while navigating, eliminating the need for going back and forth between contents on a limited display screen in a breadcrumb navigation configuration.

Figure 8:
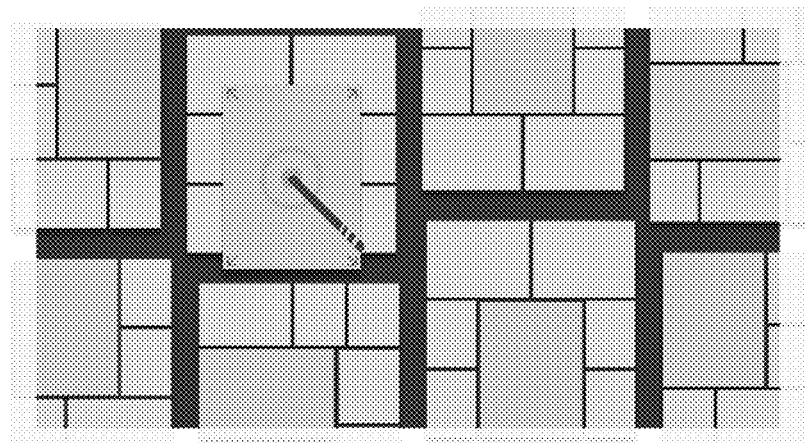
FIG. 8 shows display of digital content objects in response to a hover operation according to an embodiment consistent with the present disclosure.

In some embodiments, when the remote controller is used to point to various digital content objects, a hover over display function may be performed by the display screen. As shown in FIG. 8, a display window may appear at or next to a focused digital content object to display relevant information regarding the focused digital object. For example, information such as the title, language, storyline, and staring actors may be displayed for a movie object to help the user make the selection.

Figure 9A:
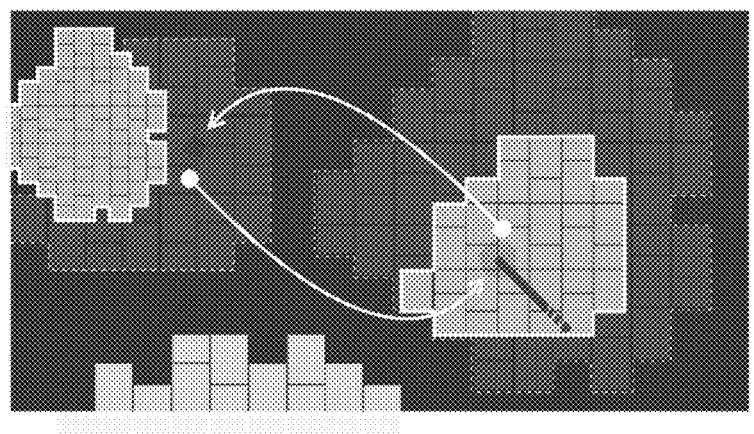
FIG. 9A shows swapping the positions of displayed digital content objects according to an embodiment consistent with the present disclosure.

In certain embodiments, the organization and categorization of the category groups may be defined according to a specific application to help the users quickly locate their interested contents and explore additional related contents within a centralized location rather than browsing through row and columns of content objects based on fixed categories. In certain embodiments, a user may define and customize category groups by providing parameters in addition to the system default groups. The user may choose to hide any non-preferred groups. In certain embodiments, deep learning algorithms may be used to understand the user's specific preferences, then update the category groups with user's agreement from time to time to provide the optimal user experience with personalization. In certain embodiments, in addition to allowing the user to show or hide certain category groups, the group locations may be swapped so that frequently used categories may be placed in the center of the view. As shown in FIG. 9A, the display locations of two category groups may be swapped by user operation.

Figure 9B:
FIG. 9B shows a grid display of digital content objects in certain TV UI applications consistent with the present disclosure.

Embodiments of the present disclosure may provide flexible content arrangement based on user's preference. For example, the UI design may not only let the user show or hide category groups, but also allow the user to swap category group locations on the display so that frequently used categories can be placed in the center view, as show in FIG. 9A. In addition, the application can have the user creating groups with existing parameters if applicable, or build the relationship among groups to have a continuous browsing experience. For example, the application can also update the groups based on AI learning per individual's preferences and habits. Content in each group can also be added and removed based on the application needs. All these user or system behaviors on the content management would not impact the overall UI architecture and structure as well as the user navigation design. The grid-based UI, as shown in FIG. 9B, provides limited view among content groups.

In some embodiments, the system may allow a user to create groups with existing parameters, or to specify relationship among groups to have a continuous browsing experience. The system may update the groups based on AI learning per individual's preferences and habits. Content in each group may also be added and removed according to the application needs.

As an example, the display and interaction system may be configured to allow a user to choose a movie from a database. In FIG. 2, the top-level category groups may include a list of film genres, including, for example, action, adventure, comedy, drama, musical, western, etc. The user may use the remote controller to point to the category group of "drama" to explore further details. When the user zooms in from the top top-level category group "drama", a list of second-level category groups within the "drama" top-level category may be displayed in a map format as shown in FIG. 4. The second-level category groups may include a list of sub-genres or themes, such as "romantic dramas", "classical dramas", "legal dramas", "melodramas", "film noir", etc. When the user selects a second-level category group, for example, "romantic dramas", to zoom in, a list of deeper-level category groups or a list of digital content objects may be displayed. The digital content objects (for example, movies) may be displayed as icons of the title pages of the movies within the selected category group. The title page icons may be displayed and arranged in a map format as shown in FIG. 6. The system may arrange the title page icons according to relevancy to the category. For example, the system may pick the most relevant and representative romantic drama for the user and display it at the center of the display map, and display less relevant and representative movies within the "romantic drama" sub-genre toward the edge of the display map.

The system may allow pan operation from the user with the remote controller to explore additional content objects (for example, additional movie title page icons) in the category group as shown in FIG. 7. As shown in FIG. 8, the system may also allow hover operation from the user with the remote controller to display additional information, such as storyline, year of production, and leading actors of a movie in a pop-up window next to the title page icon to help the user make a selection decision.

The second-level category groups and deeper-level category groups may also be defined based on other traits, such as years of productions, storylines, countries, languages, ratings, etc., or based on user defined category groups, such as "Mom's favorites", "Dad's favorites", etc. The arrangement of the digital content objects may be based on other criteria, such as popularity, ratings, etc. The goal is to categorize and arrange the digital content objects so that the user may find a content object of interest quickly and conveniently. Artificial intelligence (AI) learning algorithms may be used to process user information including browsing and media replaying history to adaptively define and edit the category groups and arrangement in the map view. The system may also allow user input to define or edit a category group, or swap the positions of category groups on the display as shown in FIG. 9.

Figure 10:
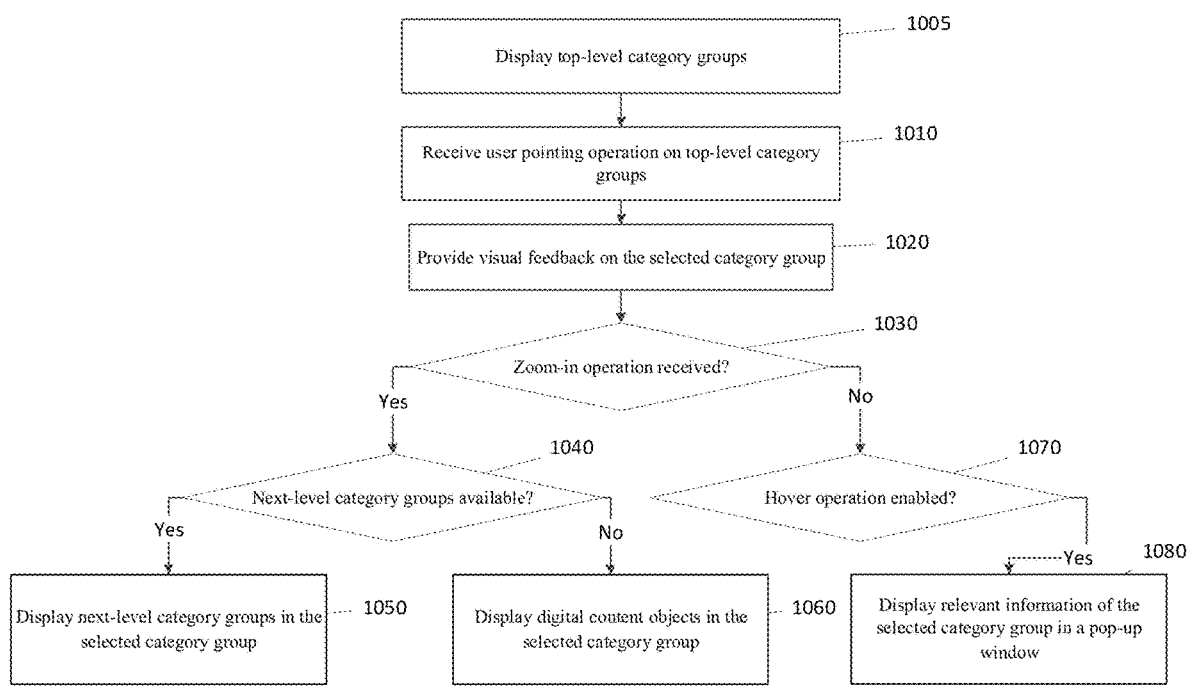
FIG. 10 is a flowchart of a digital content display and interaction method according to an embodiment consistent with the present disclosure.

FIG. 10 shows a flow-chart of a method for digital content display and interaction on a display system according to certain embodiments of the present disclosure. In Step 1005, the display system displays a plurality of top-level category groups on a display screen. In Step 1010, the display system receives a pointing operation from a user. The pointing operation may be performed using a handheld remote controller electronically coupled to a display control unit and/or the display screen of the display system to interact with the navigation interface and the digital contents outputted on the display screen. The remote controller may include positional, movement, and/or acceleration sensors, and the position, movement, and/or acceleration signals of the remote controller may be used to control a cursor on the display screen. A user may use the remote controller to move the cursor to point to a category group displayed on the display screen. In Step 1020, the display system provides visual feedback on the category group selected by the user pointing operation. In certain embodiments, the selected category group may be highlighted. In certain other embodiments, the selected category group may change color, size, shape, or undergo other display changes to indicate that the category group has been selected. In Step 1030, the system decides if a zoom-in operation has been received for the selected category group. The zoom-in operation may be performed by the user on the remote controller to indicate that the user desires to visualize the contents within the selected category group. If a zoom-in operation is received, the system further decides if next-level category groups are available in Step 1040. If the next-level category groups are available, the system displays the next-level category groups in the selected top-level category group in Step 1050. If next-level category groups are not available, the system displays digital content objects in the selected top-level category group in Step 1060. In Step 1030, if the system determines that no zoom-in operation has been received from the user, and a hover operation is enabled (Step 1070), the system may display relevant information of the selected category group in a pop-up window.

Figure 11:
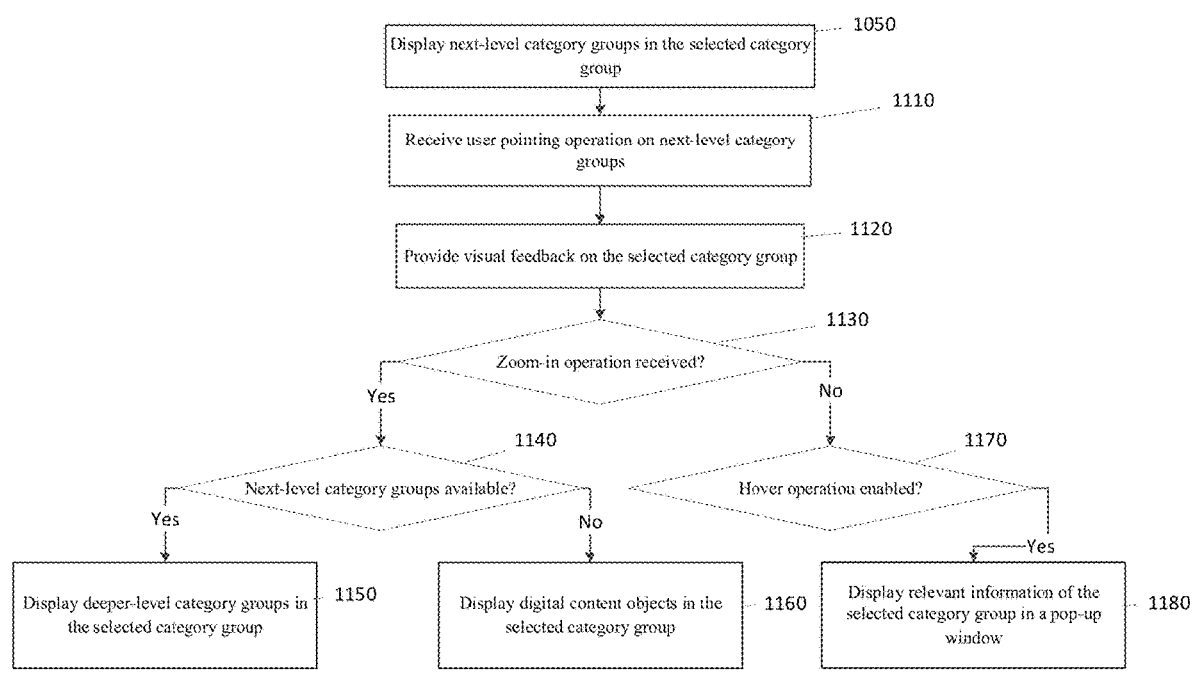
FIG. 11 is a flowchart of a digital content display and interaction method according to another embodiment consistent with the present disclosure.

Continue to FIG. 11, after the system displays the next-level category groups in the selected top-level category group in Step 1050, the system may further receive and process interaction requests from the user on the next-level category groups, including receiving a pointing operation from a user on the next-level category groups in Step 1110, providing visual feedback on the next-level category group selected by the user pointing operation in Step 1120, determining and following up with further zoom-in operations in Steps 1130-1180. The interaction steps on the next-level category groups are similar to those performed on the top-level category groups illustrated in FIG. 10, and the details are not repeated herein again.

Figure 12:
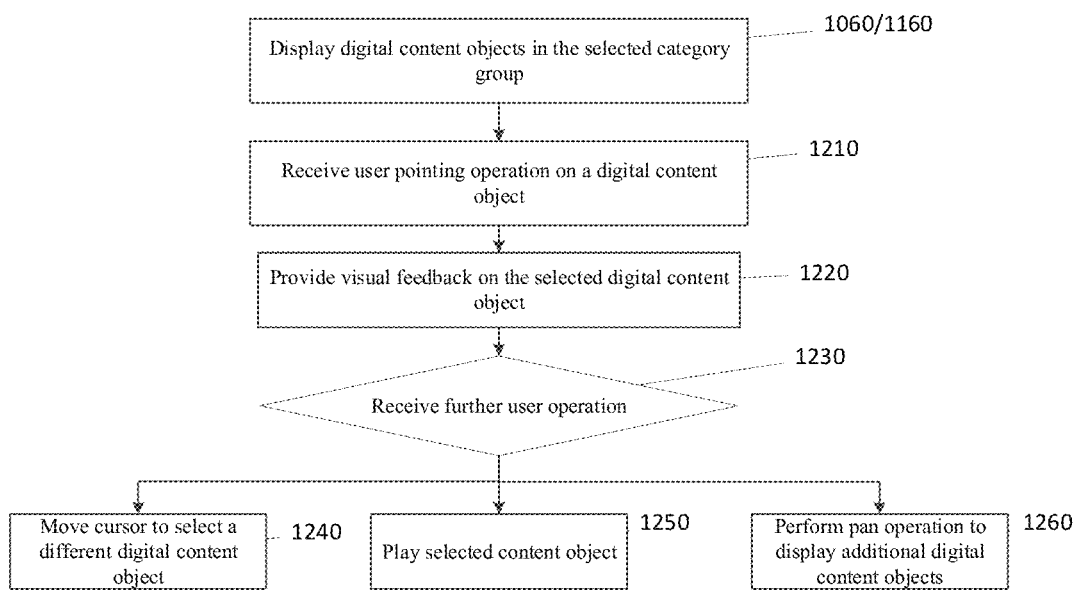
FIG. 12 is a flowchart of a digital content display and interaction method according to another embodiment consistent with the present disclosure.

Further continue to FIG. 12, In Step 1060 or 1160, when the digital content objects are displayed for a selected category group, the system may receive user pointing operation on a specific digital content object (Step 1210) and provide visual feedback on the selected digital content object (Step 1220). The system may receive further user operations from the remote controller (Step 1230) including moving the cursor to select a different digital content object (Step 1240), playing the selected content object (Step 1250), or performing a pan operation to display additional digital content objects (Step 1260).

In the method embodiments illustrated in FIGS. 10-12, certain user operations, such as the hover operation and the pan operation, may be selectively performed on a certain level of category group, and/or selectively performed on one or more digital content objects. The enablement of these operations may be determined on a specific application, system data structure, or user preference and are not specifically limited in the present disclosure. The maximum zoom-in level of category groups may also be determined according to application, system data structure, or user preference and are not specifically limited in the present disclosure.

Figure 13:
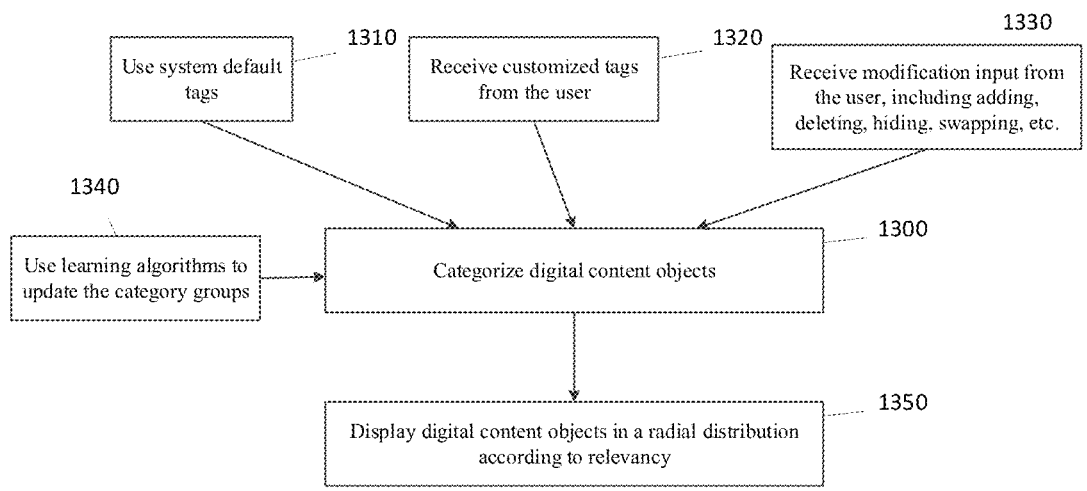
FIG. 13 is a flowchart of a digital content display and interaction method according to another embodiment consistent with the present disclosure.

FIG. 13 shows additional aspects of the method for digital content display and interaction according to certain embodiments. In certain embodiments, the organization and categorization of the category groups may be defined according to system default tags (1310) or customized tags provided by a user (1320). These tags may include features and/or keywords related to the digital content objects, such as characters, rating, publishing year, genres, audience age, etc. The system may receive user modification of the category groups (1330). For example, a user may choose to add, delete, or hide a specific category group. In certain embodiments, the group locations may be swapped so that frequently used categories may be placed in the center of the view. In certain embodiments, deep learning algorithms may be used to understand the user's specific preferences, then update the category groups with user's agreement from time to time to provide the optimal user experience with personalization (1340). In certain embodiments, the category groups or digital content objects may be displayed in a radial distribution according to relevancy (1350), where the most relevant category groups or digital content objects are displayed in the center of the view.

Embodiments of the present disclosure provide a global view of the overall digital content object organization that not only makes user feel in control, but also practically allocate interested group categories quickly and easily. A grid-based UI doesn't have such usability capability other than scrolling up and down with a predefined order. Embodiments of the present disclosure reduce user's heavy workload to browse, interpret, and memorize.

Often, the grid-based UI requires the user to scrolling up and down in order to find the interest group with little context to help the memorization and orientation. Embodiments of the present disclosure have each category group surrounded by other category groups in both vertical and horizontal directions, as well as other directions as applicable. Embodiments of the present disclosure provide a convenient access for the user to find the content with helping of context or relationship from the surrounding category groups. In contrast, the grid-based content can only see the above and below group content in most cases.

Embodiments of the present disclosure provide fluid UI designs along with the zoom in/out capability with a global view, and with surrounding context on the category group orientation. Even when a category group is added, removed, or swapped, the overall UI structure would not be impacted. The category group order may be changed with any group added or removed for the current TV UI, which also highlights the need for the user to have a global view of the overall categorizations.

Embodiments of the present disclosure provide flexibility of the content management and provide user with the maximum browsing capability within a category group. The user can view all group topics related content in a view with organized subgroups per application needs.

The current TV UIs often have the spinning carousel to view limited number of content within each category group. Each time, user can only see fixed amount of digital content objects. To view more, user needs to get to a different navigation mechanism. In addition, when new content is added or removed within each category group, in embodiments of the present disclosure, the structure of the UI would be impacted very little because the user is always presented with the category group information.

Embodiments of the present disclosure create relaxing and entertaining TV-user interaction experience for user to browse and navigate through the available digital content quickly and easily, yet accurate or relevant to user's preference. Embodiments of the present disclosure utilize zoomable map-like UI concepts that is user friendly. Embodiments of the present disclosure provide new convention to allow smooth interactive user behaviors on TV display with fluid user interface for flexible tag-based categorization management.

The forgoing description and embodiments are exemplary descriptions of the technical solutions provided by the present disclosure. Other embodiments of the disclosure will be apparent to those skilled in the art. The present disclosure is intended to cover any variations, modifications, equivalent substitutions, uses, or adaptations that are in accordance with the general principles of the present disclosure.

What is claimed is:

1. A method for displaying digital content in an interactive navigation interface, comprising:
   displaying a plurality of top-level category groups on a display screen;
   receiving a user pointing operation selecting one of the top-level category groups from a remote controller;
   providing visual feedback for the selected top-level category group;
   in response to a zoom-in operation on the selected top-level category group received from the remote controller, displaying a plurality of digital content objects within the selected top-level category group in a radial distribution according to a sorting order of category relevancy from a center to an edge of the display screen, wherein digital content objects that are most relevant according to a selection criterion are displayed at the center of the display screen and less relevant digital content objects are displayed toward the edge of display screen; and
   in response to a pan operation received from the remote controller, performing a display scrolling of the display screen to display additional digital content objects within the selected top-level category group while maintaining neighboring digital content objects in display.

2. The method according to claim 1, wherein:
   the plurality of digital content objects within the selected top-level category group are a plurality of second-level category groups; and
   the method further comprises:
      receiving a user pointing operation selecting one of the second-level category groups from a remote controller; and
      in response to a zoom-in operation on the selected second-level category group received from the remote controller, displaying a plurality of next-level digital content objects within the selected second-level category group.

3. The method according to claim 1, further comprising:
   displaying information related to the selected top-level group in a pop-up window.

4. The method according to claim 1, wherein the plurality of top-level category groups are based on one of:
   a set of keyword tags;
   a customized set of keyword tags provided by the user; or
   a processing result of an artificial intelligent algorithm performed on data collected on the user.

5. The method according to claim 1, wherein the plurality of digital content objects are displayed in an irregular-shaped distribution.

6. The method according to claim 1, wherein the plurality of top-level category groups are based on a processing result of an artificial intelligent algorithm performed on data collected on the user.

7. A method for interacting with a navigation interface on a display screen using a remote controller, comprising:
    receiving a user pointing operation on the remote controller;
    translating the user pointing operation into a user pointing command, the user pointing command including a selection position;
    sending the user pointing command to the display screen to cause the display screen to: select a top-level category group among a plurality of top-level category groups displayed on the display screen according to the selection position; and provide visual feedback for the selected top-level category group;
    receiving a zoom-in operation on the remote controller and translating the zoom-in operation into a zoom-in command;
    sending the zoom-in command to the display screen to cause the display screen to display a plurality of digital content objects within the selected top-level category group in a radial distribution according to a sorting order of category relevancy from a center to an edge of the display screen, wherein digital content objects that are most relevant according to a selection criterion are displayed at the center of the display screen and less relevant digital content objects are displayed toward the edge of display screen;
    receiving a pan operation on the remote controller;
    converting the pan operation into a pan command; and
    sending the pan command to the display screen to cause the display screen to scroll and display additional digital content objects within the selected top-level category group while maintaining neighboring digital content objects in display.

8. The method according to claim 7, wherein:
    the plurality of digital content objects within the selected top-level category group are a plurality of second-level category groups; and
    the method further comprises:
        receiving a second user pointing operation on the remote controller;
        converting the second user pointing operation into a second user pointing command, the second user pointing command including a second selection position;
        sending the second user pointing command to the display screen to cause the display screen to: select a second-level category group among the plurality of second-level category groups displayed on the display screen according to the second selection position; and provide visual feedback for the selected second-level category group;
        receiving a second zoom-in operation on the remote controller and translating the second zoom-in operation into a second zoom-in command; and
        sending the second zoom-in command to the display screen to cause the display screen to display a plurality of next-level digital content objects within the selected second-level category group.

9. The method according to claim 7, further comprising:
    receiving a hover operation on the remote controller;
    converting the hover operation into a hover command; and
    sending the hover command to the display screen to cause the display screen to display information related to the selected top-level group in a pop-up window.

10. A system for displaying digital contents in an interactive navigation interface, comprising:
    a display screen;
    a display control unit electronically coupled to the display screen; and
    a remote controller wirelessly coupled to the display control unit;
    wherein the display control unit is configured to:
        control the display screen to display a plurality of top-level category groups;
        receive a user pointing operation selecting one of the top-level category groups from the remote controller;
        control the display screen to provide visual feedback for the selected top-level category group;
        in response to a zoom-in operation on the selected top-level category group received from the remote controller, control the display screen to display a plurality of digital content objects within the selected top-level category group in a radial distribution according to according to a sorting order of category relevancy from a center to an edge of the display screen, wherein digital content objects that are most relevant according to a selection criterion are displayed at the center of the display screen and less relevant digital content objects are displayed toward the edge of display screen; and
        in response to a pan operation received from the remote controller, perform a display scrolling of the display screen to display additional digital content objects within the selected top-level category group while maintaining neighboring digital content objects in display.

11. The system according to claim 10, wherein the plurality of digital content objects within the selected top-level category group are a plurality of second-level category groups; and
    the display control unit is further configured to:
        receive a user pointing operation selecting one of the second-level category groups from a remote controller; and
        in response to a zoom-in operation on the selected second-level category group received from the remote controller, control the display screen to display a plurality of next-level digital content objects within the selected second-level category group.

12. The system according to claim 10, wherein the display control unit is further configured to control the display screen to display information related to the selected top-level group in a pop-up window.

13. The system according to claim 10, wherein the display control unit defines the plurality of top-level category groups according to one of:
    a default set of keyword tags;
    a customized set of keyword tags provided by the user; or
    a processing result of an artificial intelligent algorithm performed on data collected on the user.

14. The system according to claim 10, wherein the display control unit is configured to control the display screen to display the plurality of digital content objects in an irregular-shaped distribution.

* * * * *